US006308321B1

(12) United States Patent
Schooler (10) Patent No.: US 6,308,321 B1
(45) Date of Patent: Oct. 23, 2001

(54) METHOD FOR DETERMINING PROGRAM CONTROL FLOW (75) Inventor: Richard Schooler, Cambridge, MA (US)

(73) Assignee: Incert Software Corporation, Cambridge, MA (US)

(*) Notice: Subject to any disclaimer, the term of this patent is extended or adjusted under 35 U.S.C. 154(b) by 0 days.

(21) Appl. No.: 09/210,138

(22) Filed: Dec. 11, 1998

(51) Int. Cl.[7] .................................................. G06F 9/445
(52) U.S. Cl. ............................. 717/8; 717/9; 717/11
(58) Field of Search ................................. 717/8, 9, 11

(56) References Cited

U.S. PATENT DOCUMENTS

| | | | |
|---|---|---|---|
| 4,667,290 | 5/1987 | Goss et al. ............................. | 364/300 |
| 4,951,195 | 8/1990 | Fogg, Jr. et al. ..................... | 364/200 |
| 5,146,586 | 9/1992 | Nakano ................................. | 395/575 |
| 5,241,678 | 8/1993 | Futamura et al. ..................... | 395/700 |
| 5,265,254 | 11/1993 | Blasciak et al. ...................... | 395/700 |
| 5,428,786 | 6/1995 | Sites ..................................... | 395/700 |
| 5,488,714 | 1/1996 | Skidmore ............................. | 395/500 |
| 5,546,586 | 8/1996 | Wetmore et al. ..................... | 395/700 |
| 5,615,369 | 3/1997 | Holler ................................... | 395/709 |
| 5,675,803 | 10/1997 | Preisler et al. ........................ | 395/704 |
| 5,732,273 | 3/1998 | Srivastava et al. ................... | 395/704 |
| 5,732,275 | 3/1998 | Kullick et al. ........................ | 395/712 |
| 5,764,992 | 6/1998 | Kullick et al. ........................ | 395/712 |
| 5,790,858 | 8/1998 | Vogel ................................... | 395/704 |
| 5,802,373 | 9/1998 | Yates et al. ........................... | 395/705 |
| 5,812,855 | 9/1998 | Hiranandani et al. ................ | 395/709 |

(List continued on next page.)

FOREIGN PATENT DOCUMENTS

| | | |
|---|---|---|
| 0 372 835 A2 | 3/1990 | (EP) . |
| 0 286 361 | 4/1998 | (EP) . |
| WO 90/01738 | 2/1990 | (WO) . |

OTHER PUBLICATIONS

Aho et al., "Compilers Principles, Techniques, and Tools", Addison–Wesley Publishing, pp 513–580, 1988.*

(List continued on next page.)

Primary Examiner—Kakali Chaki
Assistant Examiner—Ted T. Vo
(74) Attorney, Agent, or Firm—Hamilton Brook Smith & Reynolds, P.C.

(57) ABSTRACT

A method of generating a program control flow definition from the program code determines entry points in the program. The code is followed, or scanned, from an entry point to a branch or jump instruction, or control flow instruction. A code block is then defined as the code from the entry point up to and including the control flow instruction. From the control flow instruction, additional entry points are identified. This is repeated for each entry point having a known value, resulting in a partial control flow definition. For entry points having unknown values, a constant propagation analysis is performed on the partial control flow definition to convert unknown entry point values to known values. Finally, the entry points determined by the constant propagation analysis are used as starting points in the scanning step to define additional entry points. The steps of scanning from known block entry points to determine additional points and using constant propagation for determining additional block entry points for unknown values are repeated to extend the control flow definition. Constant propagation is only used when there are no known block entry points. Heuristics may be used to determine certain unknown values. In addition, a knowledge of the operating system under which the program is running may be used to determine certain unknown values. A preferred embodiment is implemented with a block worklist which comprises a list of all known blocks within the program and which defines the partial control flow for the computer program during analysis, and the complete control flow upon completion of analysis. A block entry worklist comprises a list of all known block entry points whose blocks are unknown, such that each block entry point in the block entry worklist is analyzed.

13 Claims, 10 Drawing Sheets

U.S. PATENT DOCUMENTS

| | | | |
|---|---|---|---|
| 5,966,541 | * 10/1999 | Agarwal | 717/11 |
| 5,978,588 | * 11/1999 | Wallace | 717/9 |
| 6,018,747 | 1/2000 | Burns et al. | 707/203 |

OTHER PUBLICATIONS

Ferrante et al., "The Program Dependence Graph and Its Use in Optimization", ACM, pp. 319–349, Jul. 1987.*

Johnson et al., "Dependence–Based Program Analysis", ACM, pp. 78–89, Jun. 1993.*

Ammons, G., and Larus, J., "Improving Data–flow Analysis with Path Profiles," *ACM Sigplan Notices, US, Association for Computing Machinery*, 33(5): 72–84 (1998).

Hunter, C., and. Banning, J., "DOS at RISC," *Byte* *14*(12):361–368 (1989).

Ball, T., et al., "Optimally Profiling and Tracing Programs," Technical Report #1301, Rev. 1, Computer Sciences Department, University of Wisconsin—Madison, Sep., 1991.

IBM "Generic Methology for Code Patching in Binary File," Research Disclosure—Jun. 1998.

Kazuhito, Patch System, Patent Abstract of Japan (CD–ROM), Unexamined Applications, vol. 94, No. 11 (Nov. 8, 1994).

Agarwal, A. et al., "ATUM: A New Technique for Capturing Address Traces Using Microcode," Proceedings of the 13th Annual Symposium on Computer Architecture, Jun. 1986.

Robert C. Bedichek, "Some Efficient Architecture Simulation Techniques," Department of Computer Sciences, University of Washington, Usenix Conference, Jan. 1990.

Robert C. Bedichek, "Talisman: Fast And Accurate Multicomputer Simulation," 1985, Laboratory for Computer Science, Massachusetts Institute of Technology.

"Instruction Trace Apparatus. Feb. 1978," IBM Technical Disclosure Bulletin, 20(9):1–3 (Feb. 1, 1978).

* cited by examiner

METHOD FOR DETERMINING PROGRAM CONTROL FLOW

BACKGROUND OF THE INVENTION

Analysis of binary software executables is a fundamental tool for many useful applications, such as binary translation (from one computer architecture to another), post-link optimization, and binary instrumentation. All these tools need to distinguish executable code from un-reachable code and other data, and need to determine the structure of the code in terms of basic blocks and control flow paths between them.

U.S Pat. No. 5,986,541, filed Dec. 4, 1997 (Agarwal), incorporated herein by reference in its entirety, discloses a method of instrumenting original binary code to create augmented or remediated binary code, which can then perform many useful functions such as error detecting and repair. Various embodiments of the Agarwal application accomplish tasks including, but not limited to, remediation, assertion checking, test certification and coverage, continuous internal value testing, bootstrap regression testing, test path identification and statistical pattern matching.

An executable program is the final result of the software development process. That process consists of compiling source modules written by the programmer into object modules which are then linked together to produce the final executable program. The executable program thus consists of the actual machine instructions of the program, together with whatever data and descriptive information is needed to run those instructions. Higher-level source constructs such as names and structured control flow are in general no longer available.

The ability to modify an executable program to, for example, incorporate new functionality, for example as described in the Agarwal application, enables many important applications, as it obviates the need to go back to the original source, which may not be available, and to re-build the program.

Modifying the executable program is not straightforward, however, because of the structure of machine instructions. One problem is displacement update, which pertains to the manner in which instructions refer to each other.

Figure 1A:
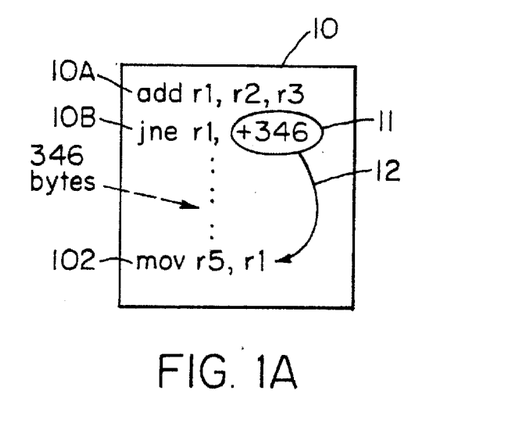
FIGS. 1A and 1B are executable code listings, using mnemonics, before and after insertion of additional code respectively. These figures demonstrate the displacement update problem.

FIG. 1A demonstrates the displacement update problem. A small piece of code 10 accesses registers named r1, r2, r3 and r5 in this example. Instruction 10A adds the contents of registers r2 and r3, and places the resulting sum into register r1. Instruction 10B tests the contents of register r1, i.e. the sum resulting from instruction 10A, and if it is less than or equal to zero, jumps 346 bytes to the last instruction 10Z of the sample code 10, as indicated by arrow 12. The number 346, called the displacement 11, has previously been calculated by the compiler and is part of the jump instruction 10B.

Figure 1B:
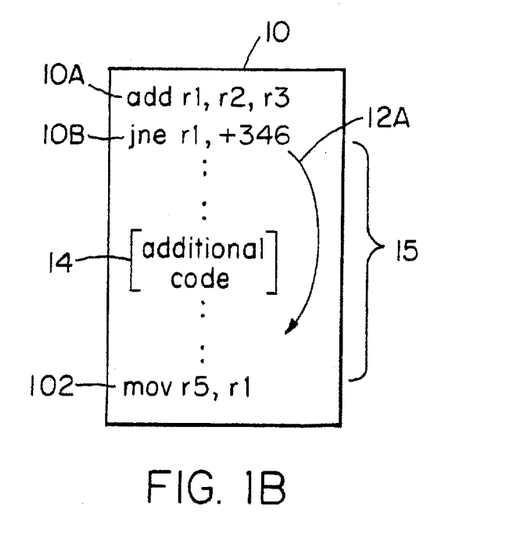

In FIG. 1B, additional code 14 has been inserted between the jump instruction 10B and its target 10Z, perhaps for one or more of the reasons described in the Agarwal application. As a result, there are more than 346 bytes in the code 15 between the jump 10B and its target 10Z, and the displacement 11 must be updated or the jump indicated by arrow 12A will be to the wrong target, possibly with catastrophic results. In addition, those displacements of any other relative jump instructions which cross that new code must also be updated, as must the target addresses of any absolute jump instructions where the target instruction has been shifted. Note that the 346 bytes separating the jump 10B and its target 10Z in FIG. 1A may contain both code and data.

Another important issue is register usage. Registers are fast storage locations within the computer's central processing unit (CPU), which typically has only a small, fixed number of registers, e.g. thirty-two registers. If the inserted code needs to make use of registers, then either registers must be chosen that do not interfere with the program's use of registers, or the programrs register usage must be changed. Register usage is a flow-sensitive analysis, since it is unlikely that there are any registers that are unused throughout the program. Thus, register usage must be calculated separately for each point in the program. In general, this analysis requires knowledge of the program's control flow structure.

Figure 2:
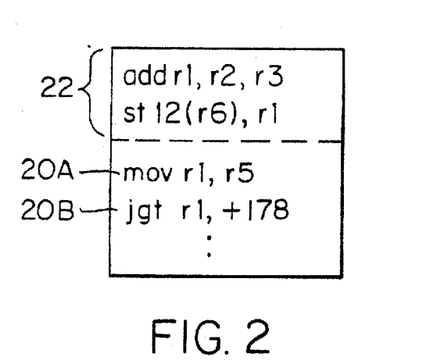
FIG. 2 is an executable code listing illustrating the concept of register usage.

FIG. 2 illustrates the concept of register usage. The original code includes instructions 20A and 20B. Instruction 20A copies the contents of register r5 into register r1. Instruction 20B is a conditional jump instruction. Since data is loaded into register r1 at instruction 20A, it is clear that just prior to instruction 20A there is no further use of whatever data may be in register r1, so that register r1 may be used freely for other purposes. Here, two new instructions 22 which use register r1 have been inserted before instructions 20A and 20B. The new instructions 22 calculate and save in register r1 the sum of the values stored in registers r2 and r3. The content of r1, i.e., the sum, is then stored in memory at a location defined by the contents of register r6 plus an offset of 12 bytes. Since the following instruction 20A copies the value of r5 into r1, the insertion of these two instructions 22 does not affect the execution of the program.

The insertion of these instructions 22 is acceptable because the following original instruction 20A moves the contents of register r5 into r1, and the original program has no further use for register r1 at the point where the new instructions 22 have been inserted. In general, all possible paths from the new instructions must be examined to determine which registers are available.

Thus, to perform the analyses that indicate what new code can be inserted at each point in the program, the control flow structure must be determined. In some cases determining this structure is simple. In first example of FIGS. 1A and 1B, for instance, the jump target is hard-coded into the instruction. This is not always true, however. Often the jump target is computed at run-time.

SUMMARY OF THE INVENTION

The present invention provides an analysis method which, starting from external entry points, discovers all reachable instructions and the control-flow paths between them in an executable program.

A major challenge is that control flow is often determined by run-time values. For instance, a branch or jump instruction might use register contents or even memory contents to determine the target. Analysis must thus include constant propagation to determine control flow.

A further challenge is that standard constant propagation algorithms are dependent on the control-flow graph, which causes a chicken-and-egg problem in analyzing binaries: constant propagation is needed to determine the control-flow, but the control-flow graph is needed to perform constant propagation.

The present invention is an iterative, incremental method that interleaves control-flow analysis and constant propagation. In brief, control-flow analysis does as much as it can without constant propagation information. Constant propagation then runs on the partial control-flow graph, which enables more control-flow analysis to be done, and so on.

In accordance with the present invention, a method of generating a program control flow definition from the program code comprises determining entry points in the program. The code is followed, or sequentially scanned or examined, from an entry point to a control flow instruction such as a branch or jump instruction. A code block is then defined as the code from the entry point up to and including the control flow instruction. From the control flow instruction, additional entry points are identified. This is repeated for each entry point having a known value, resulting in a partial control flow definition.

For entry points having unknown values, constant propagation analysis is performed on the partial control flow definition to convert unknown entry point values to known values. Finally, the entry points determined by the constant propagation analysis are used as starting points in the scanning step to define additional entry points. The steps of scanning from known block entry points to determine additional points and using constant propagation for determining additional block entry points for unknown values are repeated to extend the control flow definition. Preferably, constant propagation is only used when there are no known block entry points.

A preferred embodiment of the present invention uses heuristics to determine certain unknown values, and/or uses a knowledge of the operating system under which the program is running to determine certain unknown values.

A preferred embodiment of the present invention is implemented with a block worklist which comprises a list of all known blocks within the program and which defines the partial control flow for the computer program during analysis, and the complete control flow upon completion of analysis. A block entry worklist comprises a list of all known block entry points whose blocks are unknown, such that each block entry point in the block entry worklist is analyzed. When an end of a block beginning with the block entry point is encountered, preferably as a control flow instruction, the block is placed in the block worklist. New block entry points determined by the control flow instruction are placed in the block entry list, while constant propagation is used to determine computed block entry points. When there are no more block entry points, the block worklist represents a complete control flow graph of the program.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The control-flow analysis algorithm of the present invention maintains a worklist of block entry, or target, locations, which is initialized with any known external entry points. The algorithm makes as much progress as possible without knowledge of constant propagation values, for example with instructions such as conditional jumps that fall through to the next instruction.

A block of instructions is defined as a sequential sequence of instructions, starting with an external entry point or an entry point from a control flow instruction, i.e., a branch or jump, and terminating with a control flow instruction. Known entry points are used as starting points from which to scan code until a control flow instruction is encountered, marking the end of a block. Fall-through instructions and jump targets are added to the list of known entry points, while unknown targets, i.e., those that are computed during a run of the program, remain unresolved, until no remaining entry points remain to be analyzed. When there are no remaining entry points, constant propagation kicks in.

Figure 3:
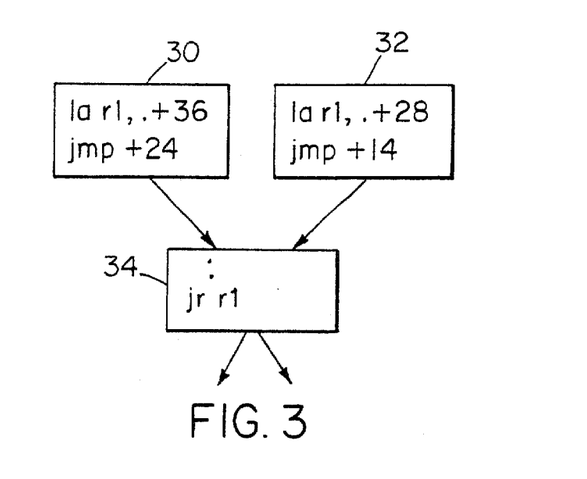
FIG. 3 is a flow diagram illustrating a control flow instruction having a target which is determined at run-time.

FIG. 3 provides such an example where the jump target is computed at run-time. Two different blocks of instructions 30, 32 place some address or displacement into register r1, i.e., the current address plus 36 and 28, respectively. Each block 30, 32 then branches to a common block 34 which is 24 and 14 bytes away, respectively. Block 34 terminates with a jump to the contents of register r1, which could be either the location set up in block 30, or the location set up in block 32, depending on which block 30, 32 was the actual predecessor to block 34 at run-time.

Therefore, to calculate the control flow from block 34, the possible values of r1 must be propagated from the predecessor, or parent, blocks 30, 32. This process of propagating a needed constant, e.g., the value in r1, is called constant propagation, and it clearly depends on the control flow.

Any standard constant propagation technique can be used as a basis, such as those described in Aho, Sethi, and Ullman, "Compilers, Principles, Techniques, and Tools", Addison-Wesley, 1986. The key is making the algorithm incremental, or able to be invoked a piece at a time. A standard worklist algorithm is used. When a new block of code is discovered, it is placed on a block worklist. The control-flow analysis and code discovery algorithm of the present invention invokes constant propagation on the block worklist when necessary.

Figure 4A:
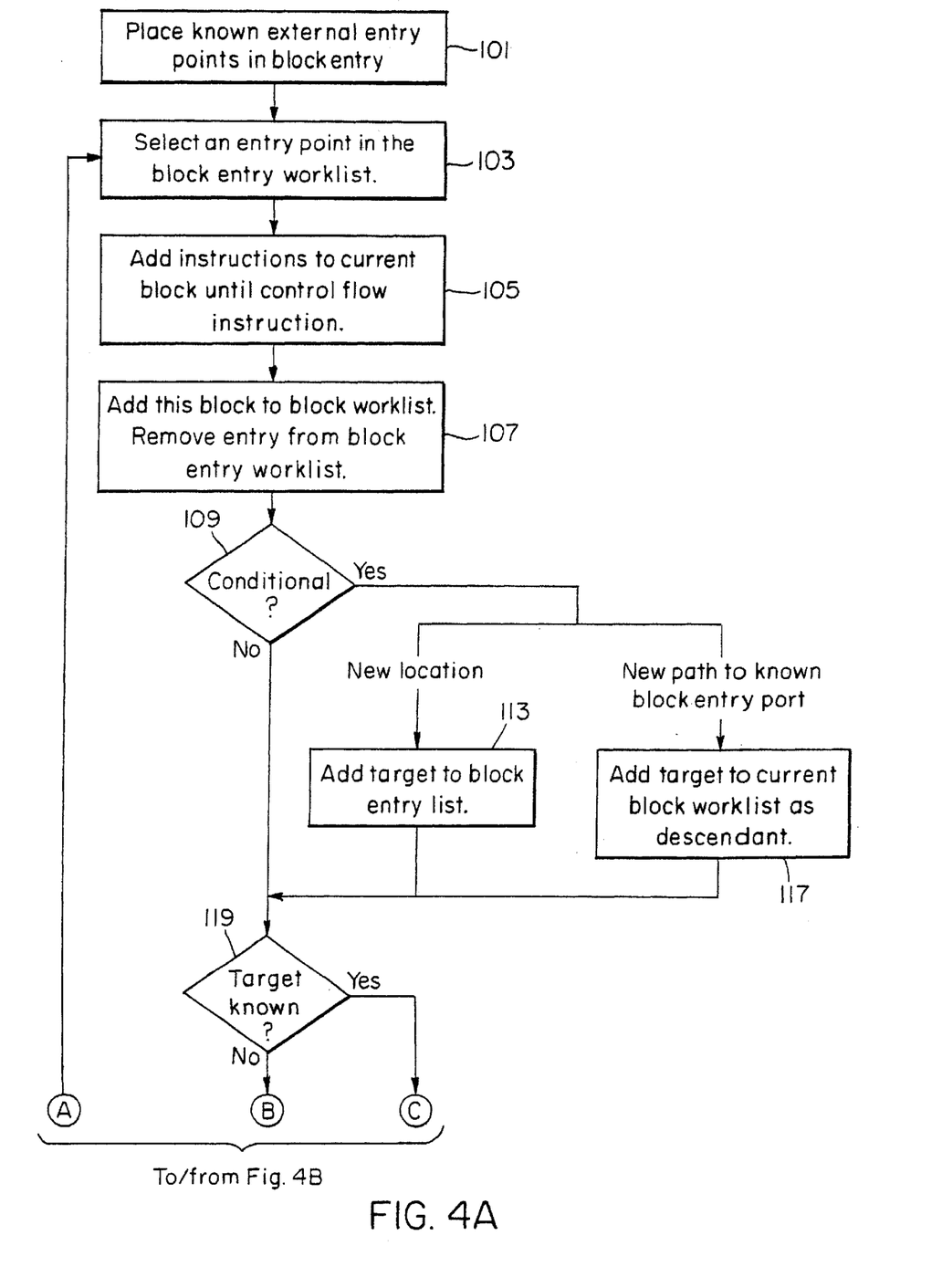
FIGS. 4A and 4B are is a flowchart of a preferred embodiment of the present invention.
Figure 4B:
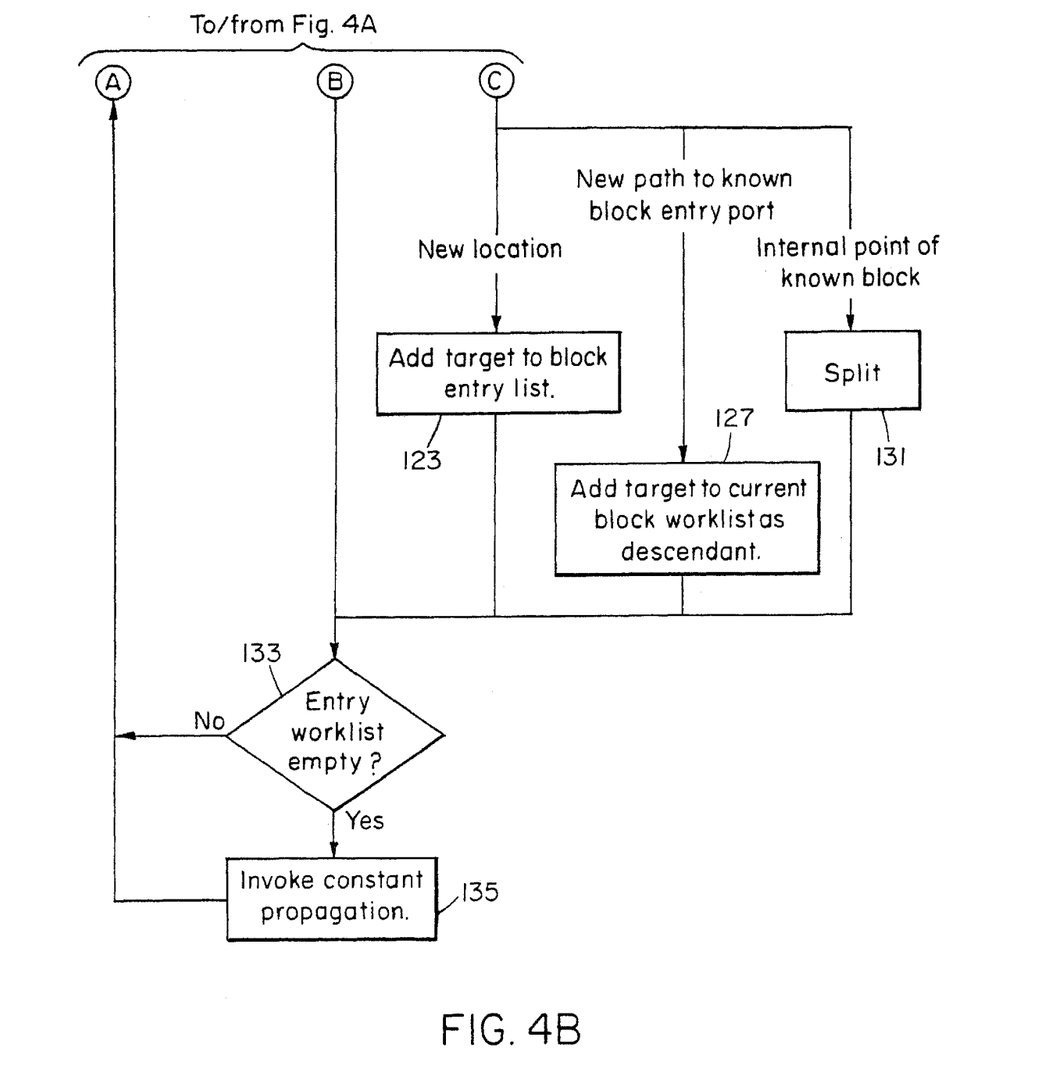

FIGS. 4A and 4B are is a flowchart of an algorithm employed by a preferred embodiment. In step 101, the system is initialized by placing known external entry points in the block entry worklist. In step 103, an entry point is selected from the block entry worklist. From this current entry point, instructions are sequentially scanned, or examined, until a jump or branch instruction is encountered (step 105). For convenience, we use the terms "branch" and "jump" interchangeably to represent all control flow instructions, including jumps and branches.

A control flow instruction defines the end of a block. Since the entry point and end of the block are known, the current block has been "discovered" and is placed into the block worklist. The corresponding entry is removed from the block entry worklist (step 107).

If the jump is conditional as determined in step 109, then the next location must be an executable instruction since the jump might not be taken. Therefore, the instruction sequentially following the jump is added to block entry worklist if it represents a new location (step 113). If it does not represent a new location, then it must be a new path to a known block or block entry point, and it is added as a descendant to the current block's worklist entry (step 117).

Next, a determination is made at step 119 as to whether the target of the jump instruction is known. If it is known, then either it is a new location, a new path to a known block or block entry point, or it is internal to some known block. If the target is a new location, then it is added to the block entry list 123. If the target represents a new path to a known block, then at step 127, the target is added to the current block's worklist entry a descendant. Finally, if the target represents an internal point of a known block, the known block is split into two smaller blocks, the first ending just before the target, and the second beginning with the target (step 131).

Step 133 is eventually reached, and a determination is made as to whether the block entry worklist is empty, i.e., whether there are more entries in the block entry worklist. If it is not empty, the process repeats back to step 103. If, on the other hand, the block entry worklist is empty, constant propagation is invoked at step 135 to discover new code-locations. Finally, the process repeats back to step 103 until completion.

FIGS. 5–11 are now used to further demonstrate the various steps shown in the flowchart of FIG. 4A and 4B.

Figure 5:
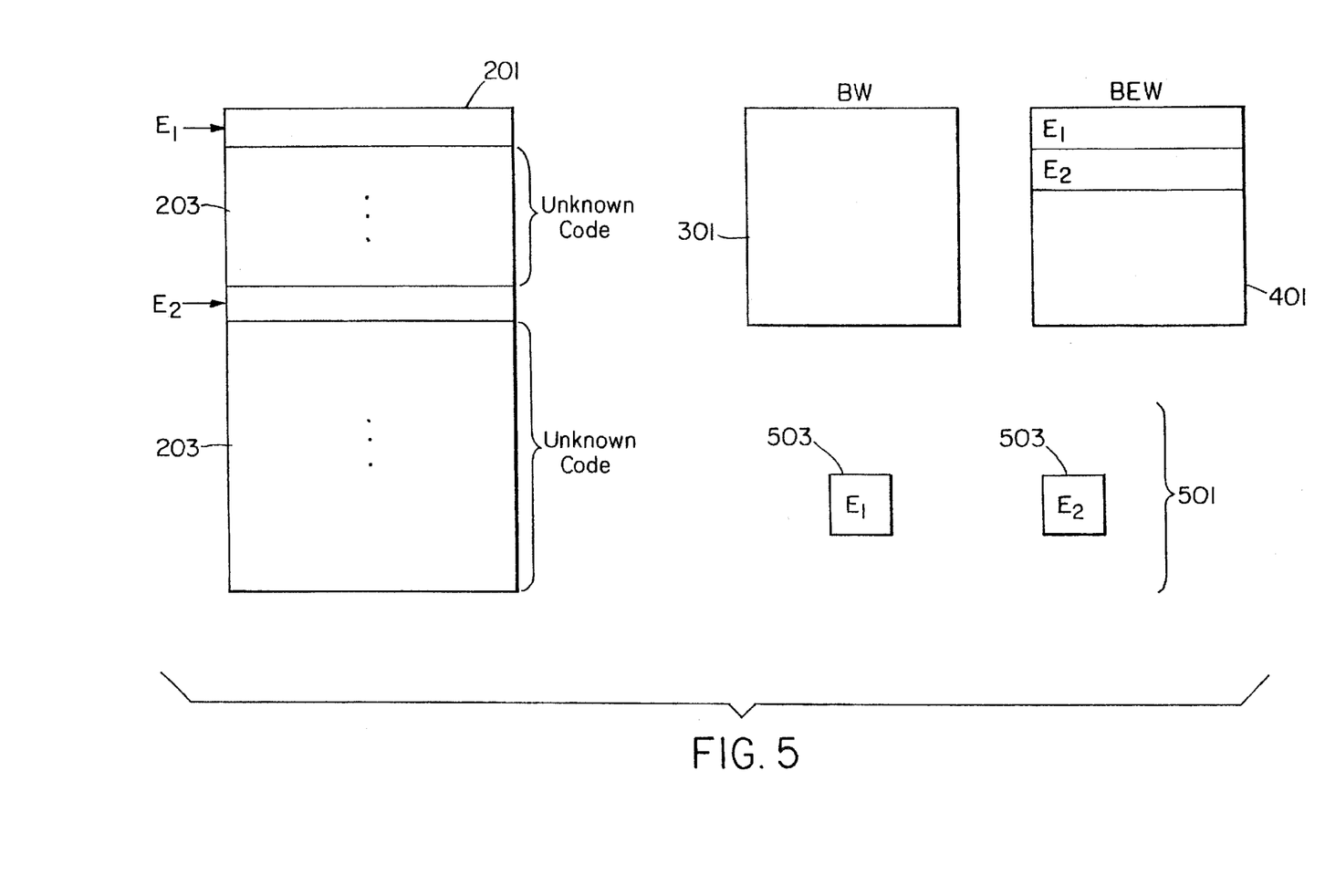
FIG. 5 is a diagram illustrating initialization of a preferred embodiment of the present invention.

FIG. 5 illustrates step 101 of FIG. 4A. Specifically, there is shown a sequential listing of executable program code 201, a block worklist (BW) 301, a block entry worklist (BEW) 401 and a control flow diagram 501. Assume for the example of FIGS. 5–11 that there are two external entry points to the program. For example, one entry point might be used when the program is called up by a certain class of user, while the other entry point might be used when the program is called up by some other class of user, including another process. The known external entry points are designated as $E_1$ and $E_2$ and their locations are shown within the program code 201. At the beginning of the analysis of the present invention, the remainder of the code, that is, everything except for the known entry points, is unknown code or data 203.

At this first step (step 101), the block worklist 301 is empty. The block entry worklist 401 is initialized by placing therein the known entry points, $E_1$ and $E_2$. At this time, the control flow graph 501 simply has two nodes 503 corresponding to the two entry points $E_1$ and $E_2$. The format of FIG. 5 is maintained for FIGS. 6, 7, 8, 9 and 11, each of which builds on the previous figure.

Figure 6:
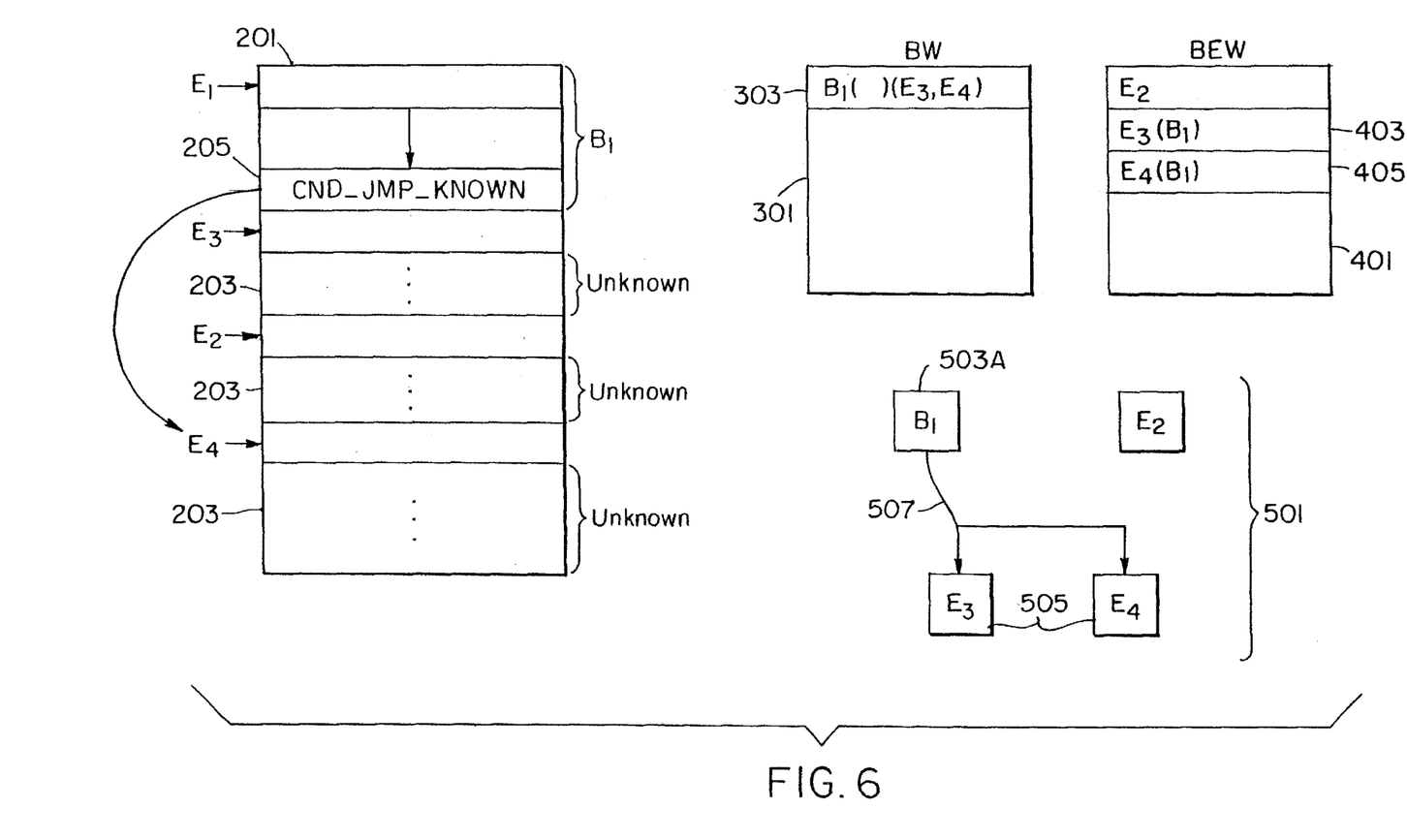
FIG. 6 is a diagram illustrating the behavior of a preferred embodiment when a conditional jump with a known target is encountered, where both the jump's target instruction and the fall-through instruction are new entry points.

FIG. 6 illustrates various steps of FIG. 4A and 4B which take place when a conditional jump with a known target is encountered, and where both the jump's target instruction and the fall-through instruction are new entry points.

In particular, the first entry point in the worklist ($E_1$ from FIG. 5) is selected (step 103). The code following instruction $E_1$ is scanned until a control flow instruction is encountered (step 105). Here, a conditional jump 205 with a known target is encountered, defining a first known block, $B_1$. According to step 107, this newly discovered block $B_1$, or actually a reference to it, is stored in the block worklist 301.

At step 109, a determination is made that the jump is conditional. The instruction following the jump, now designated $E_3$, is a new location (step 113) and is added to the block entry worklist 401. Since entry point $E_3$ is a descendant of block $B_1$, $E_3$ is listed in block $B_1$'s descendant list in block $B_1$'s block worklist entry 303. Similarly, block $B_1$ is listed as a predecessor in entry $E_3$'s block entry worklist entry 403.

In this example, the target of the jump instruction 205 is also known and is designated as $E_4$. As above with $E_3$, $E_4$ is added to the block entry worklist by adding a new entry 405. $E_4$ is listed in block $B_1$'s descendant list in block $B_1$'s block worklist entry 303, and block $B_1$ is listed as a predecessor in entry $E_4$'s block entry worklist entry 405.

Specifically, for illustration purposes, block $B_1$'s worklist entry 303 is shown as $B_1()(E_3, E_4)$. The first set of parentheses indicates a list of predecessor blocks, while the second set of parentheses indicates a list of descendant blocks or entry points. Thus, $B()(E_3, E_4)$ is meant to indicate that known block $B_1$ has no predecessor blocks, and has two descendant blocks which are yet undiscovered but whose entry points are known to be $E_3$ and $E_4$. Similarly, an entry in the block entry worklist 401 is designated as $E_3(B_1)$ to indicate that entry point $E_3$ has one known predecessor block, namely $B_1$. The actual structure of the worklists and sublists is an implementation detail and various well-known methods can be employed. Note that there are now three unknown areas 203 which may comprise code and/or data.

The control flow graph 501 has been updated. Two new nodes 505 have been added for the newly discovered entry points $E_3$ and $E_4$, with arrows 507 depicting the flow of control. Since block $B_1$ is now known, its designation has replaced that of its entry point $E_1$ in node 503A.

Figure 7:
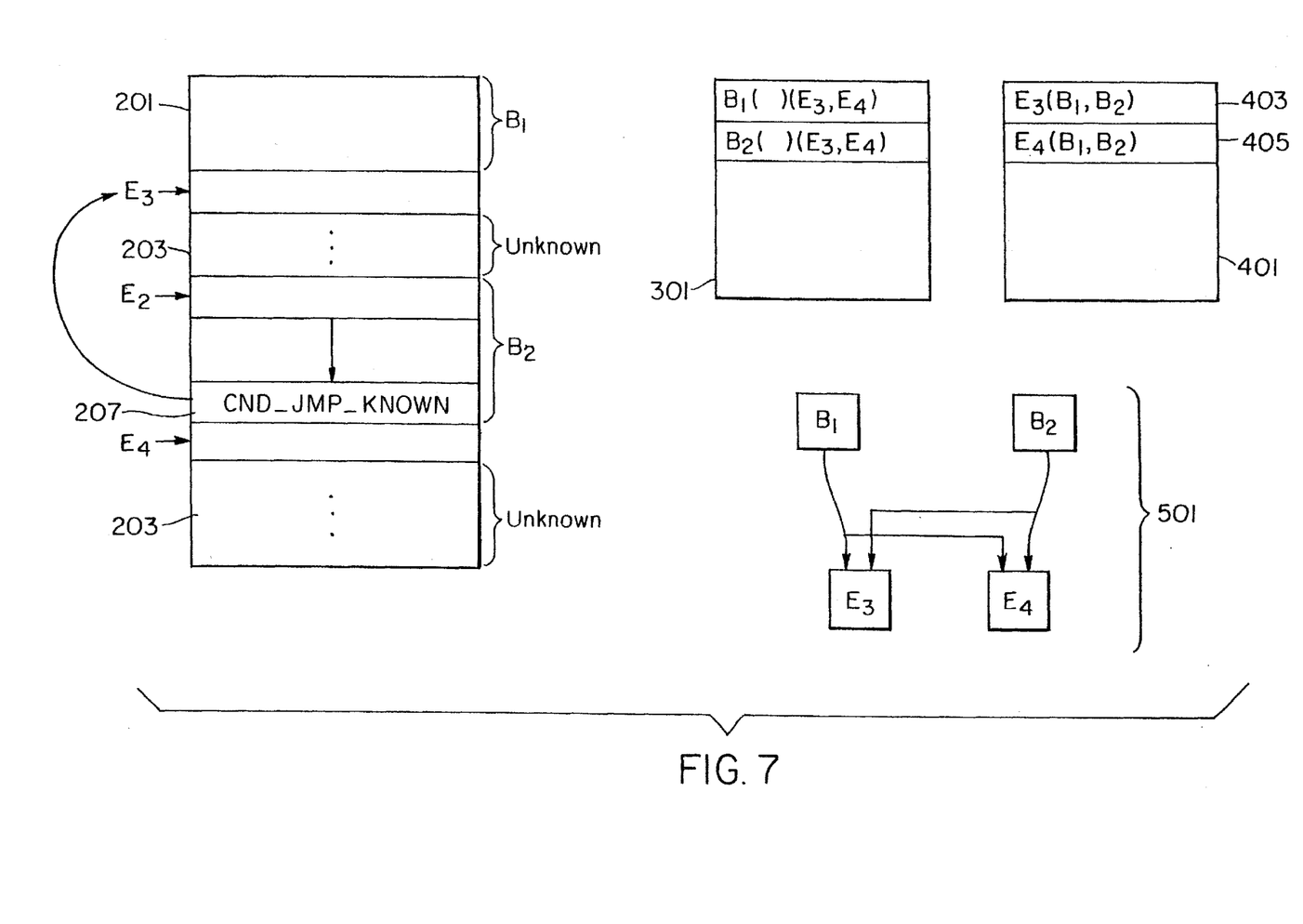
FIG. 7 is a diagram illustrating the behavior of a preferred embodiment when a conditional jump with a known target is encountered, where both the jump's target instruction and the fall-through instruction are known entry points.

FIG. 7 illustrates additional steps of FIGS. 4A and 4B which take place when a conditional jump with a known target is encountered. In this example, both the jump's target instruction and the fall-through instruction are known entry points.

The next entry point in the block entry list, $E_2$ (from FIG. 6) is selected in step 103 (FIG. 4). The code following instruction $E_2$ is scanned until conditional jump 207 with a known target is encountered, defining a new block, $B_2$, which is stored in the block worklist 301. This new block $B_2$ has no predecessor, because it is external entry point, but the two known entry points $E_3$ and $E_4$ are placed in its descendant list. Because the fall-through instruction $E_4$ and target instruction $E_3$ are known, no additional entries are made into the block entry list. However, the existing entries 403, 405 are modified to include the new block $B_2$ in their predecessor lists (steps 117 and 127 respectively).

The control flow graph 501 represented by the block worklist 301 has again been updated to show known flow.

Figure 8:
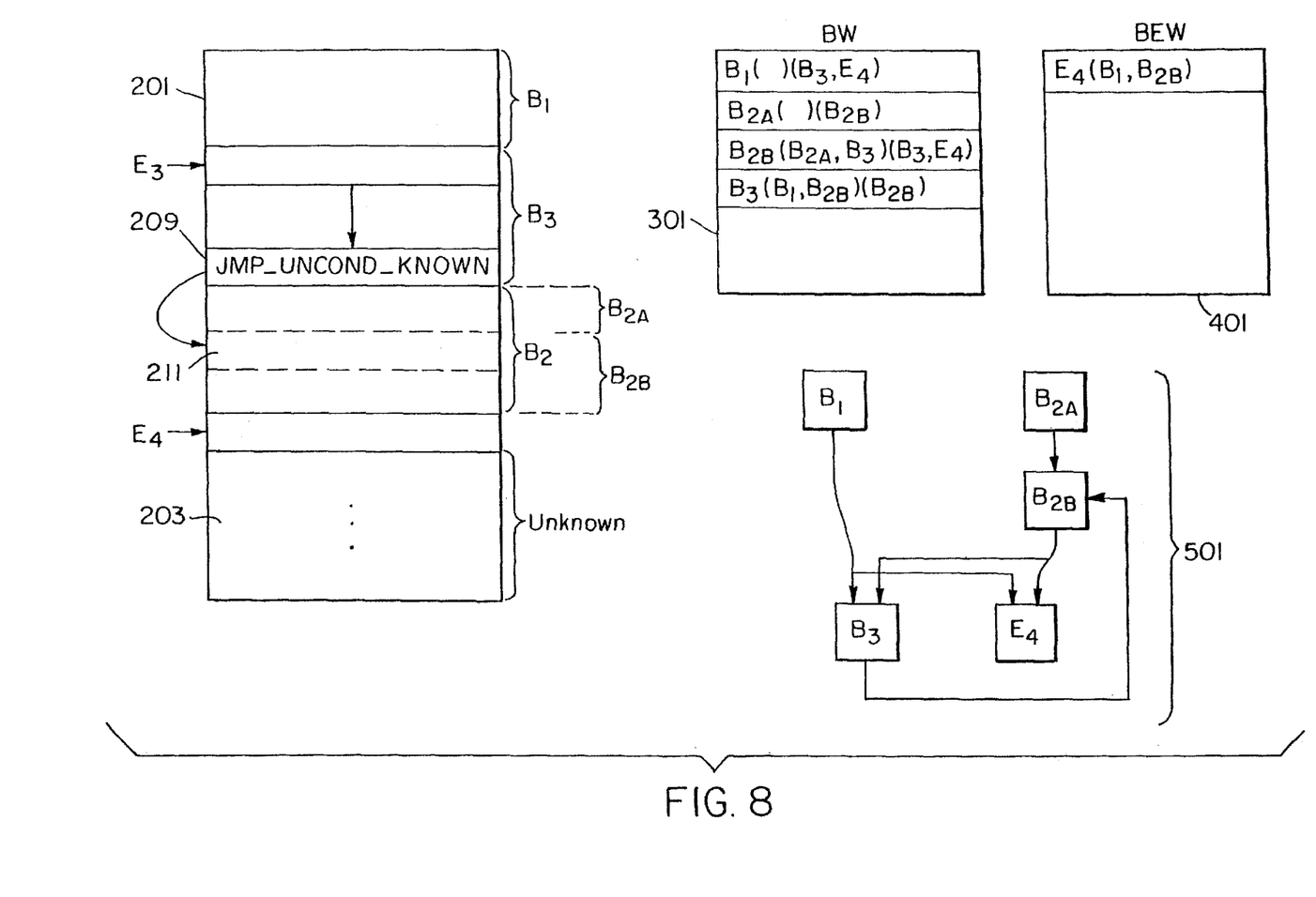
FIG. 8 is a diagram illustrating the behavior of a preferred embodiment when an unconditional jump with a known target is encountered, where target instruction is internal to a known block.

FIG. 8 illustrates the steps of FIGS. 4A and 4B which take place when an unconditional jump with a known target is encountered. Here, the target of the jump is an internal point within a known block.

The next entry point in the block entry list, $E_3$ (from FIG. 7) is selected. The code following instruction $E_3$ is scanned until unconditional jump 209 is encountered, defining a new block $B_3$, which is stored in the block worklist 301. The predecessor list, i.e., ($B_1$, $B_2$), is copied over to the new block worklist entry from the corresponding block entry worklist entry 403 for $E_3$.

The target of the jump 209 is an address 211 located within a known block $B_2$. According to step 131, block $B_2$ is thus split up into two blocks, $B_{2A}$ and $B_{2B}$, with the target address 211 as the splitting point. The entry for $B_2$ in the block worklist 301 is replaced with two new entries, one for each of block $B_{2A}$ and $B_{2B}$. Note that the first block $B_{2A}$ retains the predecessor information of the removed $B_2$ block and has block $B_{2B}$ designated as a descendant. Note also that the second block $B_{2B}$ has both the first block $B_{2A}$ and the new block $B_3$ listed as predecessor blocks, while retaining the descendant blocks or entry points ($B_3$, $E_4$) of the removed block $B_2$.

Again, the control flow graph 501 has been updated to show flow as it is now known.

Figure 9:
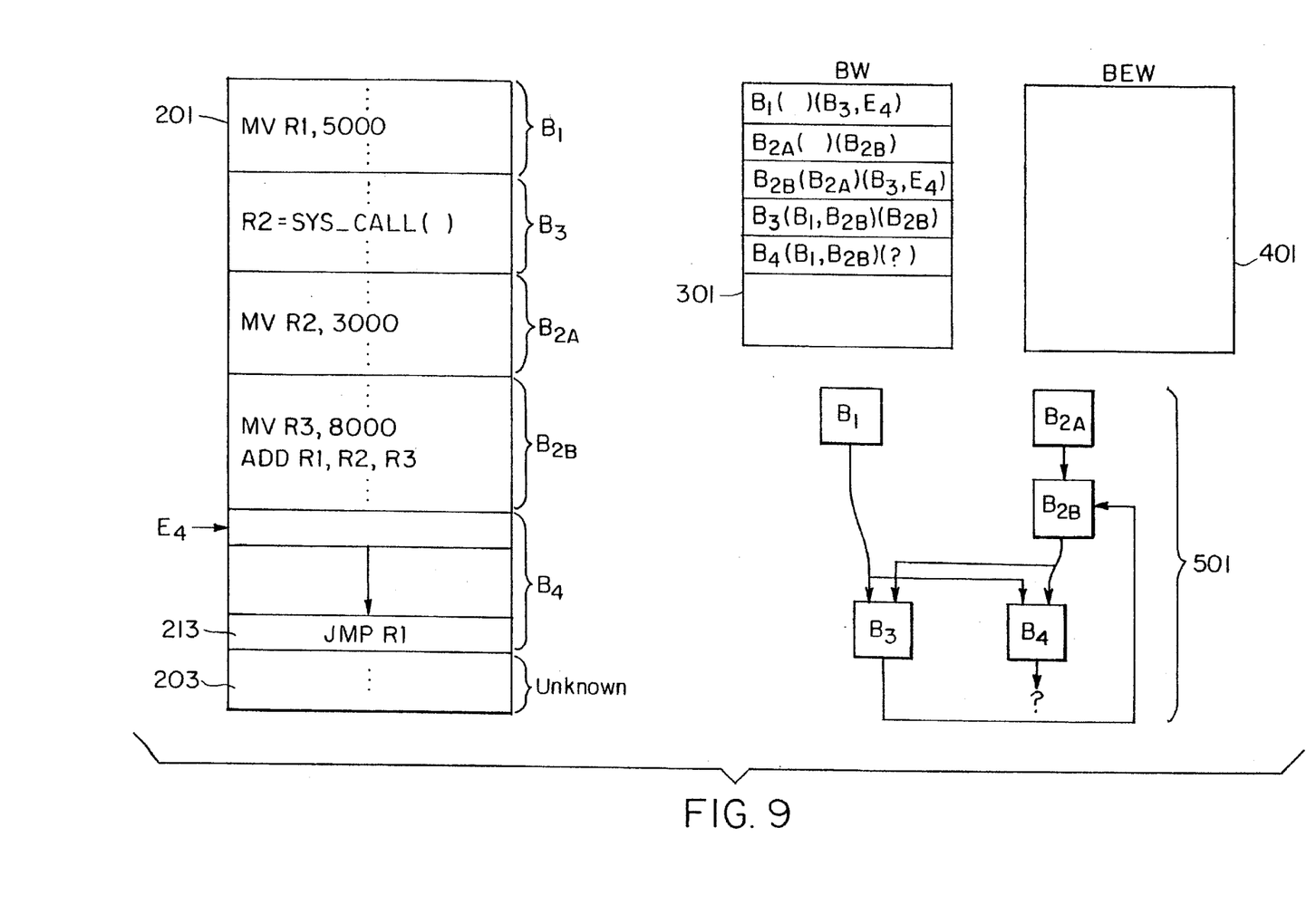
FIG. 9 is a diagram illustrating the behavior of a preferred embodiment when jump with an unknown target is encountered.

.FIG. 9 illustrates the steps of FIGS. 4A and 4B which take place when a jump with an unknown target, for example, where the target is dependent upon a run-time value stored within a register, is encountered.

Here, the next entry point in the block entry list, $E_4$ (from FIG. 8) is selected. The code following instruction $E_4$ is scanned until a jump instruction 213 is encountered, defining new block $B_4$, which is stored in the block worklist 301, with its known predecessors $B_1$ and $B_{2B}$.

Now, in this example the jump instruction 213 is a "JMP R1" instruction, which means control should flow to the address indicated by the contents of register R1. However, the contents of register R1 cannot be known until the code is actually executed. Furthermore, when jump instruction 213 is executed at different times, the contents of register R1 could be different. For example, the control flow graph 501 now illustrates the control flow of the program as it is currently known. The program control could have flowed into block $B_4$ several different ways. Working backwards from block $B_4$, either by visually inspecting the control flow graph 501, or by using (as the present invention does) the block worklist 301, it is seen that $B_1$ is a predecessor to $B_4$, as is $B_{2B}$. Furthermore, blocks $B_{2A}$ and $B_3$ are predecessors to block $B_4$.

Looking at the code itself 201, block $B_1$ contains an instruction "MV R1, 5000" which copies the value "5000" into register R1. Block $B_3$ contains a system call which fills register R2 with some value. Block $B_{2A}$ contains an instruction "MV R2, 3000" which copies the value "3000" into register R2. Finally, block $B_{2B}$ contains two instructions "MV R3, 8000" and "ADD R1, R2, R3", which copy the the value "8000" into register R3 and then add the values contained in registers R2 and R3, leaving the sum in register R1.

FIG. 10 illustrates again the control flow graph 501 of FIG. 9, with the associated instructions described above next to the corresponding nodes. Control flow is followed backwards along three different paths until all possible values of register R1 can be determined. For example, by propagating backwards from block $B_4$ to block $B_1$ along Path1, it is seen that R1 will always contain the value "5000" when this path is taken. Thus, when Path1 is taken, R1 will contain "5000" and the jump instruction 213 will virtually become "JMP 5000". Therefore, the address 5000 becomes a target of the jump instruction 213.

Figure 10:
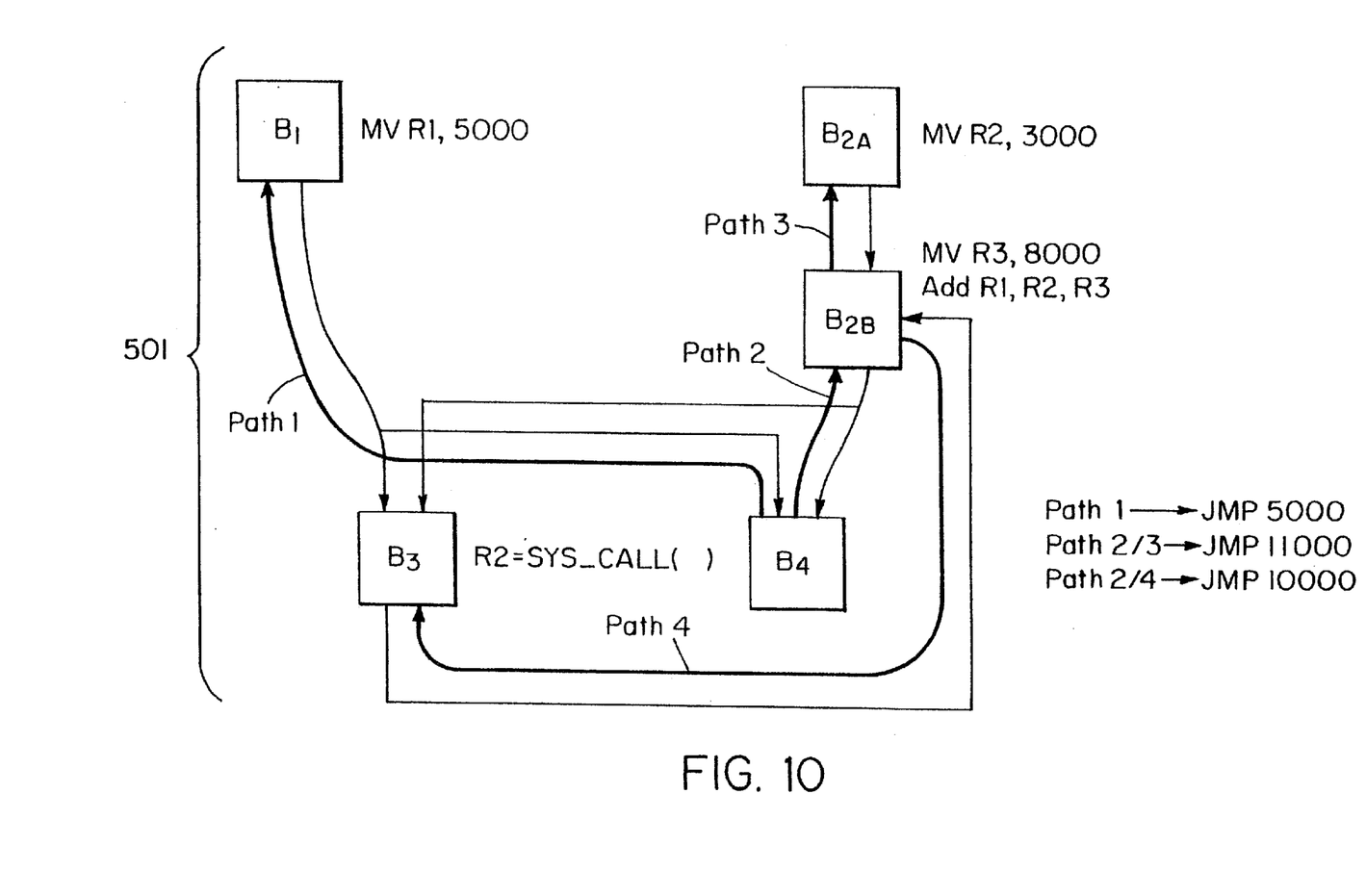
FIG. 10 is a control flow graph corresponding to that of FIG. 9, further demonstrating constant propagation paths.

Similarly, propagating backwards along Path2 to block $B_{2B}$, it is seen that the value of register R1 is set in block $B_{2B}$ to the sum of registers R2 and R3. While register R3 is set to the value "8000" in the same block $B_{2B}$, the value of register R2 is still unknown. Therefore, the analysis must propagate further back.

One possible path is Path3 to block $B_{2A}$. Here, it is seen that R2 is set to the value "3000". Plugging this value into the ADD instruction of block $B_{2B}$, it can be seen that register R1 will ultimately hold the value R2+R3=3000+8000= 11000. Thus, when Path2/Path3, or simply Path2/3, is taken, R1 will contain "11000" and the jump instruction 213 is virtually "JMP 11000". Therefore, the address 11000 is a second target of the jump instruction 213.

Another possible path from block $B_{2B}$ is along Path4 to block $B_3$, which is seen to contain a system call which fills register R2 with some value. Here, a preferred embodiment of the present invention may have a priori knowledge of the specific operating system, or of the run-time system specific to the language or the compiler used to generate the program, or may determine a likely value by using heuristics, or may use profile information, i.e., information obtained during one or more previous executions of the program. The run-time system includes, for example, a set of library routines linked in by the compiler.

For example, assume that the preferred embodiment knows that this particular system call always returns the value "2000", for instance. This value is then propagated forward to block $B_2B$ where it is added to "8000", the contents of register R3. Thus, when Path2/Path4, or simply Path2/4, is taken, R1 will contain 2000+8000=10000, which is then a third target of the jump instruction 213.

This technique of walking backwards through the control flow graph, finding constant values, and propagating them forward is called constant propagation, and is used by the present invention to discover all possible control-flow paths. Without constant propagation, other analyses, such as register usage, will produce incorrect results. If constant propagation cannot exactly determine the target, then a safe approximation must be made, using heuristics or a prior knowledge of system calls, as described above.

Up to a point, it is sufficient to "discover" some paths that cannot in fact be followed, since this will make subsequent analyses more conservative, but not incorrect. It is important not to confuse code and data however. If, by mistake, some data is thought to be a possible jump target and hence to be instructions, then it is possible that subsequent operations, such as inserting new code and modifying displacements, will disturb the data.

Figure 11:
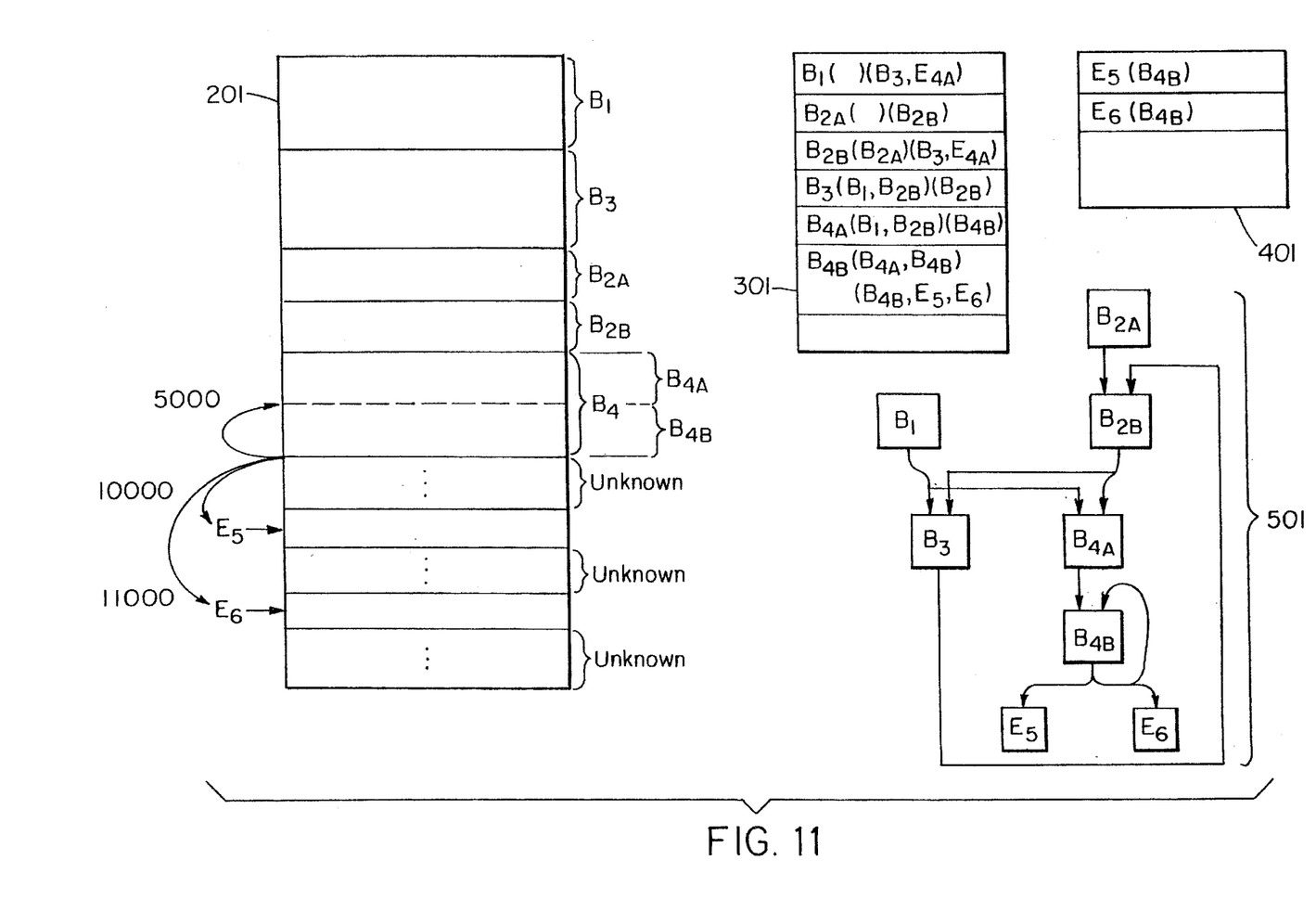
FIG. 11 is a diagram illustrating the state of the present invention after constant propagation is employed as in FIG. 10.

FIG. 11 illustrates the result of the constant propagation employed in step 135 of FIG. 4B and just described. Here, the first target address, 5000 is an internal point within a known block $B_4$. Therefore, block $B_4$ is split into two smaller blocks $B_{4A}$ and $B_{4B}$ just as block $B_2$ was split earlier.

Addresses 10000 and 11000, on the other hand, represent new entry points $E_5$ and $E_6$, which are added to the block entry worklist 401, each having block $B_{4B}$ listed as a predecessor block. The representative control flow graph 501 is updated to reflect the new information.

The constant propagation algorithm must "decorate", or fill, every variable with every known possible value for that variable. As seen in the flowchart of FIG. 4, the analyzer then reverts back to normal control flow analysis (step 103), using the new entry points $E_5$ and $E_6$ contained in the block entry worklist 401.

This process of repeatedly going back and forth between control flow analysis and constant propagation continues until the full analysis is complete.

When this algorithm is complete, not only do we have a full control-flow graph 501, detailing all possible paths between blocks of instructions, but we have also determined which code is live, or reachable from an external entry point. Code that is not live is called dead, and cannot be executed regardless of the program input.

With knowledge of the control-flow graph, the program can be safely altered or patched by modifying jump and branch targets appropriately. As an extra precaution, protective instructions can be added to dead code to indicate or prevent execution of the dead code. Such protective instructions include, for example, tracing instructions, such as a print statements, or blocking instructions, such as a halt instructions.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of generating a program control flow definition from the program code, comprising:

maintaining a block worklist which comprises a list of all known blocks within the program and which defines a control flow for the computer program; and maintaining a block entry worklist which comprises a list of all known block entry points whose blocks are unknown; and analyzing each block entry point in the block entry worklist by placing a block beginning with the block entry point into the block worklist when an end of the block is encountered, and by placing new block entry points determined by the block end into the block entry list, while using constant propagation to determine computed block entry points, such that when there are no more block entry points, the block worklist represents a control flow graph of the program, the step of analyzing further comprising a) determining entry points in the program;

b) following code from an entry point to a branch or jump instruction to define a code block;

c) from the block branch or jump instruction, identifying another entry point and repeating step b for each entry point having a known value to create a partial control flow definition;

d) for entry points having unknown values, performing a constant propagation analysis on the partial control flow definition to convert unknown entry point values to known values; and e) from entry points determined in step d, repeating steps b and c to extend the control flow definition.

2. The method of claim 1 wherein step d) further comprises:

determining certain unknown values based on characteristics of an operating system, the program running under the operating system.

3. The method of claim 1 wherein step d) further comprises:

determining certain unknown values based on characteristics of a run-time environment, the program running in the run-time environment.

4. The method of claim 1 wherein step d) further comprises:

determining certain unknown values based on profile information obtained from at least one previous execution of the program.

5. The method of claim 1, further comprising the step of:

adding protective instructions to dead code to indicate or prevent execution of the dead code.

6. A method of generating a program control flow definition from the program code, comprising:

maintaining a block worklist which comprises a list of all known blocks within the program and which defines a control flow for the computer program; and maintaining a block entry worklist which comprises a list of all known block entry points whose blocks are unknown; and analyzing each block entry point in the block entry worklist by placing a block beginning with the block entry point into the block worklist when an end of the block is encountered, and by placing new block entry points determined by the block end into the block entry list, while using constant propagation to determine computed block entry points, such that when there are no more block entry points, the block worklist represents a control flow graph of the program, the step of analyzing further comprising a) determining entry points in the program;

b) using control flow analysis to determine, from known block entry points, code blocks and new block entry points by utilizing known jump and branch instruction targets; and c) using constant propagation to determine unknown jump and branch instruction targets, said targets when determined becoming additional block entry points.

7. The method of claim 6 further comprising alternating steps b) and c).

8. The method of claim 7 wherein step c) is performed when no more known block entry points remain.

9. The method of claim 6 wherein step c) is performed when no more known block entry points remain.

10. The method of claim 6, further comprising:

splitting a known block into two new blocks when a target is discovered to be an address within the known block, the address defining a splitting point.

11. A method of iteratively generating a program control flow definition from the program code, comprising:

maintaining a block worklist which comprises a list of all known blocks within the program and which defines a control flow for the computer program; and maintaining a block entry worklist which comprises a list of all known block entry points whose blocks are unknown; and analyzing each block entry point in the block entry worklist by placing a block beginning with the block entry point into the block worklist when an end of the block is encountered, and by placing new block entry points determined by the block end into the block entry list, while using constant propagation to determine computed block entry points, such that when there are no more block entry points, the block worklist represents a control flow graph of the program, the step of analyzing further comprising partially defining a control flow using known target values to define entry points; and determining entry point values using constant propagation through the partially defined control flow.

12. A computer program control flow analyzer, comprising:

a block worklist which comprises a list of all known blocks within the program and which defines a control flow for the computer program; and a block entry worklist which comprises a list of all known block entry points whose blocks are unknown; and an analyzer that analyzes each block entry point in the block entry worklist by placing a block beginning with the block entry point into the block worklist when an end of the block is encountered, and by placing new block entry points determined by the block end into the block entry list, while using constant propagation to determine computed block entry points, such that when there are no more block entry points, the block worklist represents a control flow graph of the program.

13. The analyzer of claim 12 wherein the end of a block comprises a control flow instruction.

\* \* \* \* \*